US006348963B2

(12) United States Patent
Fukui

(10) Patent No.: US 6,348,963 B2
(45) Date of Patent: Feb. 19, 2002

(54) APPARATUS AND METHOD FOR PROCESSING SHEET MATERIAL AND IMAGE RECORDING APPARATUS

(75) Inventor: Takashi Fukui, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/768,309

(22) Filed: Jan. 25, 2001

(30) Foreign Application Priority Data

Jan. 25, 2000 (JP) ....................................... 2000-016064

(51) Int. Cl.[7] ................................................ G03B 27/62
(52) U.S. Cl. .......................................... 355/75; 271/276
(58) Field of Search ..................... 355/75, 76; 271/259, 271/276, 277; 101/486

(56) References Cited

U.S. PATENT DOCUMENTS 4,660,825 A * 4/1987 Umezawa ................... 271/276
4,718,659 A * 1/1988 Hayashi ....................... 271/259
5,324,023 A * 6/1994 Fedorjaka ................... 271/277
6,213,020 B1 * 4/2001 Kawada et al. ............. 101/486

* cited by examiner

*Primary Examiner*—D Rutledge
(74) *Attorney, Agent, or Firm*—Sughrue Mion, PLLC

(57) ABSTRACT

A leading edge chuck provided at a leading edge clamp unit and a trailing edge chuck provided at a trailing edge clamp unit are removable from a rotating drum. Therefore, a direction in which the rotating drum rotates in order for printing plates to be mounted thereon, a direction of rotation when the printing plates are exposed, and a direction of rotation in order for the printing plates to be removed from the rotating drum may all be made into a same, single direction. Accordingly, labor impacting working effectiveness, such as switching the rotational direction of the rotating drum, can be eliminated, and image exposure can be conducted rapidly.

25 Claims, 8 Drawing Sheets

APPARATUS AND METHOD FOR PROCESSING SHEET MATERIAL AND IMAGE RECORDING APPARATUS

BACKGROUND OF THE INVENTION

1. Field of the Invention

The present invention relates to a method and apparatus by which sheet material is subjected to a predetermined processing, and an image recording apparatus.

2. Description of the Related Art

Generally, a photosensitive printing plate (hereinafter referred to as a "printing plate"), in which a photosensitive layer is formed on a support formed in a sheet configuration such as a thin aluminium plate, is utilized in printing. The printing plate is used as a printing plate for printing when development processing and the like is effected after an image has been recorded by exposure.

In such an image exposure apparatus in which a printing plate is subjected to image exposure, a light beam corresponding to image data to be recorded on the printing plate is irradiated on the printing plate while the printing plate is mounted to a revolving drum and held thereto as the rotating drum is rotated at a high speed, whereby the printing plate is scanned and exposed.

Among image exposure apparatuses in which a printing plate is exposed to light using a rotating drum, there is an image exposure apparatus that uses a fixing device to fix non-image portions of both ends of the printing plate along the circumferential direction of the rotating drum by clamping the ends of the printing plate to the rotating drum when the printing plate has been mounted to the rotating drum. Such a fixing device generally nips the printing plate ends between clamp portions and the rotating drum by urging the clamp portions facing the printing plate toward the periphery of the rotating drum with an urging force.

However, because a leading edge portion of the printing plate is clamped by a clamp that is continuously fixed to the rotating drum, there has been the need to switch a trailing edge of the printing plate with the leading edge (i.e., reverse the rotating drum) at the time the printing plate is ejected. There has thus been a problem in that switching the rotation of the drum from a normal rotation to a reverse rotation not only requires time, but the interval until the next image is exposed becomes long and working efficiency is poor.

SUMMARY OF THE INVENTION

The present invention has been devised in consideration of the facts described above. An object of the present invention is to provide an apparatus and method in which sheet material is subjected to a predetermined processing, and an image recording apparatus, which can improve working efficiency.

This object is achieved in accordance with the principles of the present invention by an apparatus for subjecting sheet material to predetermined processing, the apparatus comprising:

(a) a rotatably mounted drum having a periphery for winding sheet material thereon;

(b) a leading edge clamp unit movable to a withdrawn position separated from the drum and to a clamping position proximate the drum, the leading edge clamp unit including a leading edge chuck for clamping the leading edge of the sheet material to the drum;

(c) a trailing edge clamp unit movable to a withdrawn position separated from the drum and to a clamping position proximate the drum, the trailing edge clamp unit including a trailing edge chuck for clamping the trailing edge of the sheet material to the drum;

(d) a processing element by which sheet material on the periphery of the drum is subjected to predetermined processing;

(e) a wrapping element, that moves in correspondence with a clamp operation of the leading edge chuck, to wrap the sheet material on the periphery of the drum in a sequence of a sheet material front portion, a middle portion and an end portion; and (f) a separation element, that moves in correspondence with an unclamp operation of the leading edge chuck, to separate the sheet material from the periphery of the drum in a sequence of the sheet material front portion, middle portion and end portion.

The object is also achieved in accordance with the principles of the present invention by a method of subjecting sheet material to predetermined processing, using a rotatable drum having a periphery on which sheet material is wound, the method comprising the steps of:

(a) clamping the sheet material leading edge to the drum;

(b) winding the sheet material on the drum periphery in order of the sheet material front portion, middle portion and end portion;

(c) clamping the sheet material trailing edge to the drum;

(d) subjecting the sheet material on the drum periphery to predetermined processing;

(e) disengaging the clamp on the sheet material leading edge; and (f) removing the sheet material from the drum periphery in order of the sheet material front portion, middle portion and end portion.

The object is also achieved in accordance with the principles of the present invention by an apparatus for recording an image on a printing plate, the apparatus comprising:

(a) a rotatably mounted drum having a periphery for winding a printing plate thereon;

(b) a leading edge clamp unit movable to a withdrawn position spaced from the drum and to a clamping position proximate the drum, the leading edge clamp unit including a leading edge chuck for clamping the printing plate leading edge to the drum, and a moving mechanism, which when operated, moves the leading edge chuck between the withdrawn and clamping positions;

(c) a trailing edge clamp unit movable to a withdrawn position spaced from the drum and to a clamping position proximate the drum, the trailing edge clamp unit including a trailing edge chuck for clamping the printing plate trailing edge to the drum, and a moving mechanism, which when operated, moves the trailing edge chuck between the withdrawn and clamping positions;

(d) a recording head disposed for recording an image on a printing plate on the drum periphery;

(e) a wrapping element, that moves in correspondence with a clamp operation of the leading edge chuck, to wrap the printing plate on the drum periphery in a sequence of a printing plate front portion, a middle portion and an end portion; and (f) a separation element, that moves in correspondence with a clamp disengaging movement of the leading edge chuck, to separate the printing plate from the drum periphery in the sequence of the printing plate front portion, middle portion and end portion.

DESCRIPTION OF THE PREFERRED EMBODIMENTS

Figure 1:
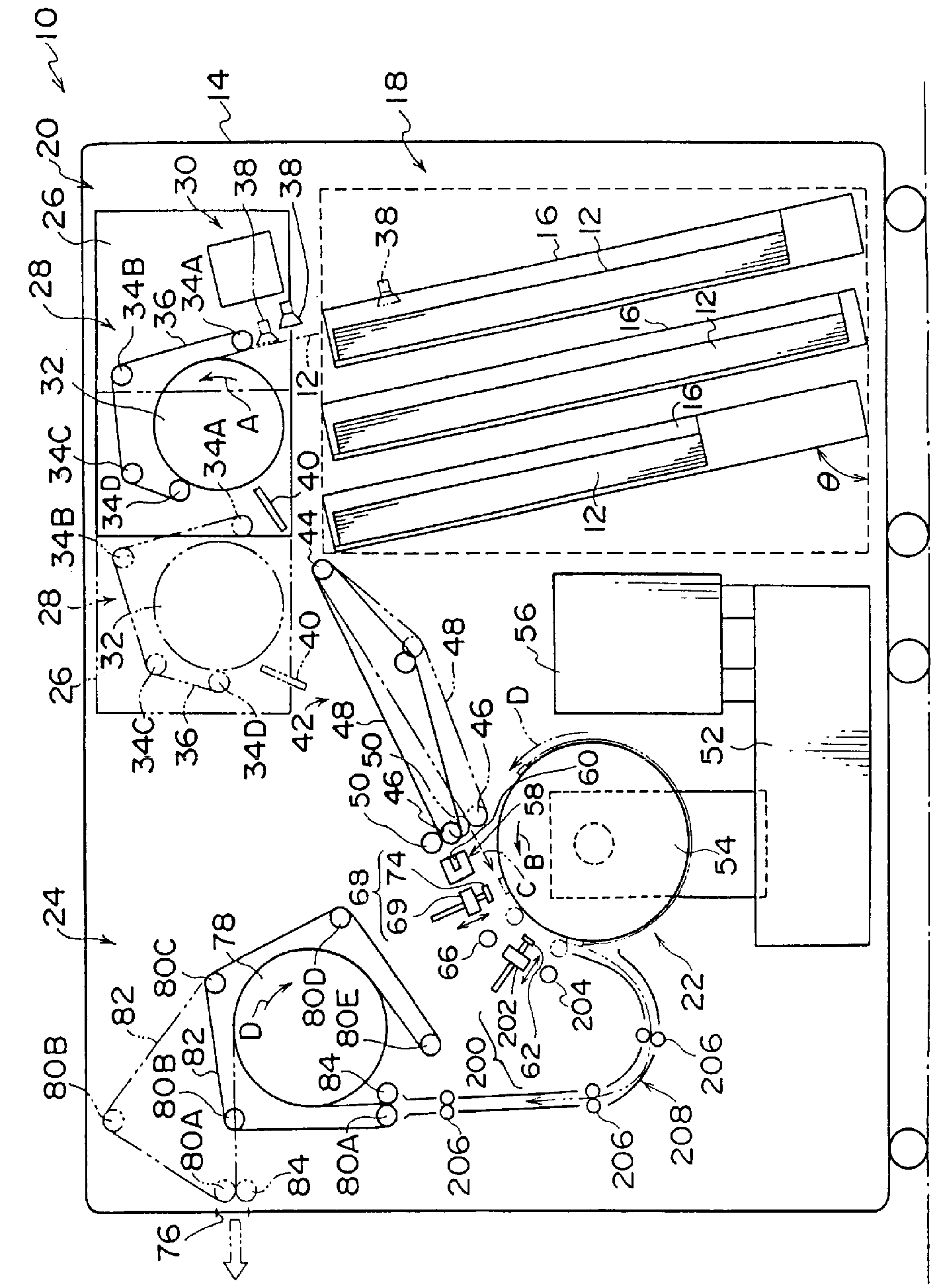
FIG. 1 is a schematic structural view illustrating an image exposure apparatus according to an embodiment of the present invention.

Hereinafter, a preferred embodiment of the present invention will be described with reference to drawings. In FIG. 1, a schematic structural view of an image exposure apparatus 10 is illustrated. Using a photosensitive planographic plate (hereinafter referred to as a "printing plate 12"), in which a photosensitive layer is formed on a thin (e.g., having a thickness of about 0.3 mm), rectangular plate support formed of, for example, aluminium, the image exposure apparatus 10 irradiates onto the printing plate 12 a light beam modified on the basis of image data, whereby the printing plate 12 is scanned and exposed. The printing plate 12, for which image exposure has been completed by the image exposure apparatus 10, is then subjected to development processing and the like by an unillustrated automatic developing apparatus.

A cassette loading section 18, a plate-supplying conveyor section 20, a recording section 22 and an ejection buffer section 24 are disposed inside a machine casing 14 to structure the image exposure apparatus 10. The cassette loading section 18 is disposed at a lower right-hand side of FIG. 1 inside the machine casing 14. A plurality of cassettes 16, that each accommodate a plurality of printing plates 12, is loaded at a predetermined angle θ in a state in which the cassettes 16 are slanted in the cassette loading section 18.

It is possible to process in the image exposure apparatus 10 numerous-sized printing plates 12 having different vertical and horizontal dimensions. Printing plates 12 of whatever size are accommodated in the cassettes 16 such that the photosensitive layers of the printing plates 12 face upward and an end thereof is positioned to correspond to a predetermined position. Further, a plurality of the cassettes 16 is loaded in the cassette loading section 18 such that an end of the printing plates 12 accommodated in each cassette 16 reaches a substantially constant height at predetermined intervals.

The plate-supplying conveyor section 20 is disposed above the cassette loading section 18. The recording section 22 is disposed at a lower, central area within the image exposure apparatus 10, adjacent to the cassette loading section 18. A pair of side plates 26 (only one of which is illustrated in FIG. 1) is provided in the plate-supplying conveyor section 20. A reversal unit 28 and a sheet unit 30 are mounted at the side plates 26.

The reversal unit 28 is provided with a reverse roller 32 having an outside diameter of a predetermined dimension. A plurality of small rollers (in the present embodiment, four small rollers 34A, 34B, 34C and 34D are shown as an example) is provided at the periphery of the reverse roller 32. The small rollers 34A through 34D are disposed so as to straddle the reverse roller 32 from the cassette loading section 18 to the recording section 22, and an endless conveyor belt 36 is mounted on the small rollers 34A to 34D. Accordingly, the conveyor belt 36 is wound on the reverse roller 32 so that the conveyor belt 36 stretches to roughly half the circumference of the reverse roller 32 between the small roller 34A and the small roller 34D.

The sheet unit 30 is provided with a plurality of suction cups 38 that adsorb top ends of the printing plates 12 inside the cassettes 16. The sheet unit 30 lowers the suction cups 38 down toward the top ends of the printing plates 12 inside the cassettes 16 loaded in the cassette loading section 18, whereby the printing plates 12 are adsorbed by the suction cups 38. The sheet unit 30 then raises the suction cups 38 that have adsorbed the printing plates 12, whereby the printing plates 12 are extracted from the cassettes 16 and leading edges of the extracted printing plates 12 are inserted between the reverse roller 32 and the conveyor belt 36. An outline of the position in which the suction cups 38 move is indicated in FIG. 1 by a two-dot chain line.

The reversal unit 28 rotates the reverse roller 32 and the conveyor belt 36 in the direction that the printing plates 12 are extracted from the cassettes 16 (i.e., in the direction of arrow A in FIG. 1). Accordingly, the printing plates 12 are nipped between the reverse roller 32 and the conveyor belt 36 and extracted from the cassettes 16. The printing plates 12 are then mounted on the periphery of the reverse roller 32, whereby they are curved, conveyed and reversed. The radius of the reverse roller 32 is of a dimension (e.g., 100 mm) such that kinks or bends are not generated in the printing plates 12 at the time the printing plates 12 have been curved.

As indicated by the solid line and the two-dot chain line in FIG. 1, the side plates 26 move horizontally in accordance with the position of the cassettes 16 from which the printing plates 12 are to be extracted. Accordingly, the suction cups 38 of the sheet unit 30 oppose the printing plates 12 within the cassette 16 that has been selected.

Further, a guide 40 is provided below the small roller 34D at the side plate 26. Printing plates 12 reversed by the reversal roller 32 are sent toward the guide 40 from between the reversal roller 32 and the conveyor belt 36 at the small roller 34D side. A conveyor 42 is disposed above the recording section 22, and printing plates 12 sent out from the reversal unit 28 are guided to the conveyor 42 by the guide 40.

Further, the guide 40 oscillates in accompaniment with a movement of the side plates 26 such that the guide 40 ensures that the direction in which the printing plates 12 are guided is always toward the conveyor 42. The small roller 34D near the recording section 22 moves in accompaniment with the movement of the side plates 26 to alter the direction in which the printing plates are fed out from the reversal unit 28. When the small roller 34D moves, the small roller 34C moves to provide a substantially constant tension to the conveyor belt 36. Accordingly, printing plates 12 fed out from the reversal unit 28 are gently curved by the guide 40.

At the conveyor 42, a conveyor belt 48 is wound between a roller 44 adjacent to an area beneath the plate-supplying conveyor section 20 and a roller 46 adjacent to an area above the recording section 22. The conveyor 42 is slanted such that the roller 46 is disposed lower than the roller 44. A roller 50 that opposes the roller 46 is disposed at the conveyor 42. Printing plates that have been sent to the conveyor 42 are conveyed on the conveyor belt 48 and nipped by the roller 46 and the roller 50.

A rotating drum 54 and a recording head 56 are mounted on a rack 52 at the recording section 22. A puncher 58 is disposed above the rotating drum 54. Printing plates 12 are nipped by the roller 46 and the roller 50, and the leading edges of the printing plates 12 are inserted into an opening 60 in the puncher 58 and retained. When the leading edges of the printing plates 12 are inserted into the opening 60, the puncher 50 forms a position-determining notch at a predetermined position in the leading edges of the printing plates 12.

When a notch is formed in the printing plate 12, the conveyor 42 drives in reverse the conveyor belt 48 and the rollers 46 and 50, and extracts the leading edge of the printing plate 12 from the opening 60 of the puncher 58. Further, an unillustrated oscillating means is disposed at the conveyor 42. Using the roller 44 as an axis, the roller 46 is lowered by the oscillating means toward the rotating drum 54 of the recording section 22. Accordingly, the leading edge of the printing plate 12 on the conveyor belt 48 is disposed at a predetermined position at the periphery of the rotating drum 54, by the printing plate 12 on the conveyor belt 48 being directed toward the rotating drum 54 and conveyed thereto.

The rotating drum 54 is rotated by the unillustrated oscillating means only in a counter-clockwise direction of FIG. 1 (i.e., in the direction of arrow B in FIG. 1).

A leading edge clamp unit 200 is disposed at a predetermined position along the periphery of the rotating drum 54. The leading edge clamp unit 200 is provided with a leading edge chuck 62 and a moving mechanism 202. The moving mechanism 202 moves the leading edge chuck 62 in the radial direction of the rotating drum 54, and can take a predetermined position at the circumferential surface of the rotating drum 54 and a position removed from the rotating drum 54. Structural details of the leading edge clamp unit 200 will presently be discussed.

Here, when a printing plate 12 is to be mounted on the rotating drum 54, the position of the leading edge chuck 62 is decided in advance to be at a predetermined position at the circumferential surface of the rotating drum 54 (at this time, the leading edge chuck 62 is in a state of separation from the moving mechanism 202). In a state in which the leading edge of the printing plate 12 is fed from a tangential direction by the conveyor 42 and nipped by the rotating drum 54 and a squeeze roller 66 that acts as a presser roller, the leading edge of the printing plate 12 (see arrow C in FIG. 1) temporarily stops the rotating drum 54 at a position corresponding with the leading edge chuck 62 (i.e., a printing plate mounting position), or rotates the rotating drum 54 at an ultra-low speed.

A cam (not illustrated) is provided at the leading edge chuck 62. By the rotation of the cam, an insertion space for the printing plate 12 is created at the circumferential surface of the rotating drum 54. Thereafter, in a state in which the leading edge of the printing plate 12 has been inserted between the leading edge chuck 62 and the rotating drum 54, the cam is rotated, and the leading edge of the printing plate 12 is nipped and held between the leading edge chuck 62 and the circumferential surface of the rotating drum 54. At this time, the printing plate 12 is positioned with respect to the rotating drum 54, by a position-determining pin (not illustrated) that protrudes from a predetermined position at the circumferential surface of the rotating drum 54 being set into the notch of the printing plate 12 formed by the puncher 58.

When the leading edge of the printing plate 12 is fixed at the rotating drum 54, the rotating drum 54 once again rotates, or continues to rotate, in the same direction (i.e., the direction of arrow B in FIG. 1), whereby the printing plates 12 that are fed out from the conveyor 42 are sequentially wound onto the circumferential surface of the rotating drum 54 (see arrow D in FIG. 1).

At an upper stream vicinity of the leading edge clamp unit 200, the squeeze roller 66 that functions as a first presser roller moves toward the rotating drum 54, whereby the printing plate 12 wound upon the rotating drum 54 is pressed toward the rotating drum 54. The printing plate 12 is thus closely adhered to the circumferential surface of the rotating drum 54.

A trailing edge clamp unit 68 is disposed at an upper stream vicinity of the leading edge clamp unit 200. The trailing edge clamp unit 68 is provided with a trailing edge chuck 74 and a moving mechanism 69. The moving mechanism 69 moves the trailing edge chuck 74 in the radial direction of the rotating drum 54, and can take a predetermined position at the circumferential surface of the rotating drum 54 and a position removed from the rotating drum 54. The trailing edge clamp unit 68 has substantially the same structure as that of the leading edge clamp unit 200. Structural details of the trailing edge clamp unit 68 will presently be discussed.

At the trailing edge clamp unit 68, while the printing plate 12 is wound onto the rotating drum 54, the trailing edge chuck 74 is held by the moving mechanism 69 at a position removed from the rotating drum 54, whereby interference with the printing plates 12 is prevented.

Here, at the point in time when the winding of the printing plate 12 onto the rotating drum 54 is roughly concluded and the trailing edge of the printing plate 12 arrives between the trailing edge clamp unit 68 and the rotating drum 54, the moving mechanism 69 is operated and the trailing edge chuck 74 is mounted at a predetermined position at the rotating drum 54 (separate from the moving mechanism 69). Thereafter, the trailing edge chuck 74 presses the trailing edge of the printing plate 12 against the outer surface of the rotating drum 54 where the trailing edge of the printing plate 12 is held. At this time, the squeeze roller 66 functions as a second presser roller and prevents the trailing edge of the printing plate 12 from rising, whereby the trailing edge of the printing plate 12 is reliably clamped.

In the recording section 22, after the leading edge and the trailing edge of the printing plate 12 have been held at the rotating drum 54, the squeeze roller 66 is moved away from the rotating drum 54. Thereafter, while the rotating drum 54 is rotated at a high speed in the same direction (i.e., the direction of arrow B in FIG. 1), a light beam modulated on the basis of image data is irradiated from the recording head 56 in synchrony with the rotation of the rotating drum 54. Accordingly, the printing plate 12 is scanned and exposed on the basis of the image data.

Namely, the recording head 56 irradiates a light beam to conduct a main scanning by rotating the drum 54 and to conduct a sub-scanning along a rotational axis of the drum 54 in connection with the main scanning, such that an image may be recorded on the printing plate 12.

When scanning and exposure of the printing plate 12 is completed, the leading edge chuck 62 that is holding the leading edge of the printing plate 12 momentarily stops (or rotates at an ultra-low speed) the rotating drum 54 at a position corresponding to the leading edge clamp unit 200. In addition, the clamping of the printing plate 12 is released, and the printing plate 12 is nipped at the rotating drum 54 by a squeeze roller 204 that functions as a third presser roller. At the leading edge clamp unit 200, the moving mechanism 202 is operated, and the leading edge chuck 62 is removed from the rotating drum 54. Accordingly, the leading edge of the printing plate 12 is released.

Thereafter, with the squeeze roller 66 as a starting point, the printing plate 12 is fed away in a direction tangential to the rotating drum 54 by the rotation of the rotating drum 54 in the same direction.

As illustrated in FIG. 1, the printing plate 12 is guided by a guide plate 208 provided with a plurality of rollers 206, and conveyed at a circular arc movement locus in the direction of the ejection buffer section 24.

The clamping of the trailing edge of the printing plate 12 by the trailing edge chuck 74 is released at a predetermined timing based on the length of the direction in which the printing plate 12 is conveyed and the speed at which the rotating drum 54 rotates. In addition, the trailing edge chuck 74 is separated and moved away from the rotating drum 54 by the moving mechanism 69 of the trailing edge clamp unit 68. Accordingly, the printing plate 12 is smoothly fed out toward the ejection buffer section 24.

The ejection buffer section 24 is disposed to the inner side of an outlet 76 formed in the machine casing 14, and is provided with an ejection roller 78. A plurality of small rollers (as an example, small rollers 80A, 80B, 80C, 80D and 80E) is disposed around the periphery of the ejection roller 78. An endless conveyor belt 82 is wound between the small rollers 80A through 80E. The conveyor belt 82 is thus wound between the small rollers 80A through 80E around the ejection roller 78 in a range of between about ½ to about ¾ the circumference of the ejection roller 78.

The small roller 80A projects out toward the squeeze roller 66 of the recording section 22, and is disposed opposite the roller 84. The printing plate 12 fed out from the recording section 22 is guided between the small roller 80A and the roller 84 and nipped therebetween by the same.

At the ejection buffer section 24, while the printing plate 12 that is nipped by the small roller 80A and the roller 84 is pulled out from the recording section 22 by the rotation of the ejection roller 78 in the same direction as that in which the printing plate 12 is extracted (i.e., the direction of arrow D in FIG. 1), the printing plate 12 is guided to between the ejection roller 78 and the conveyor belt 82, is nipped by the same and then wound around the ejection roller 78. At this time, at the ejection buffer section 24, the small roller 80A and the roller 54 nip the leading edge (at the recording section 22, the side of the leading edge chuck 62) of the printing plate 12, whereby the printing plate 12 wound around the ejection roller 78 is primarily held.

As indicated by the two-dot chain line in FIG. 1, at the ejection buffer section 24, the small roller 80A and the roller 84 move to a position facing the outlet 76. The small roller 80B above the small roller 80A moves in accordance with the movement of the small roller 80A to provide a constant tension to the conveyor belt 82.

At the ejection buffer section 24, when the leading edge of the printing plate 12 faces the outlet 76, the ejection roller 78 is rotated in the direction that the printing plate 12 is ejected (i.e., the opposite direction of arrow D) at a rotational speed that corresponds to the speed at which the printing plate 12 is conveyed at processing apparatuses, such as an automatic developing apparatus and the like (not illustrated), provided adjacent to the outlet 76. Accordingly, the printing plate 12 is fed out from the outlet 76.

Hereinafter, structural details of the leading edge clamp unit 200 will be described. Further, since the structure of the trailing edge clamp unit 68 is the same as that of the leading edge clamp unit 200 (with the exception of a 180° difference in orientation), details thereof will be omitted.

Figure 2:
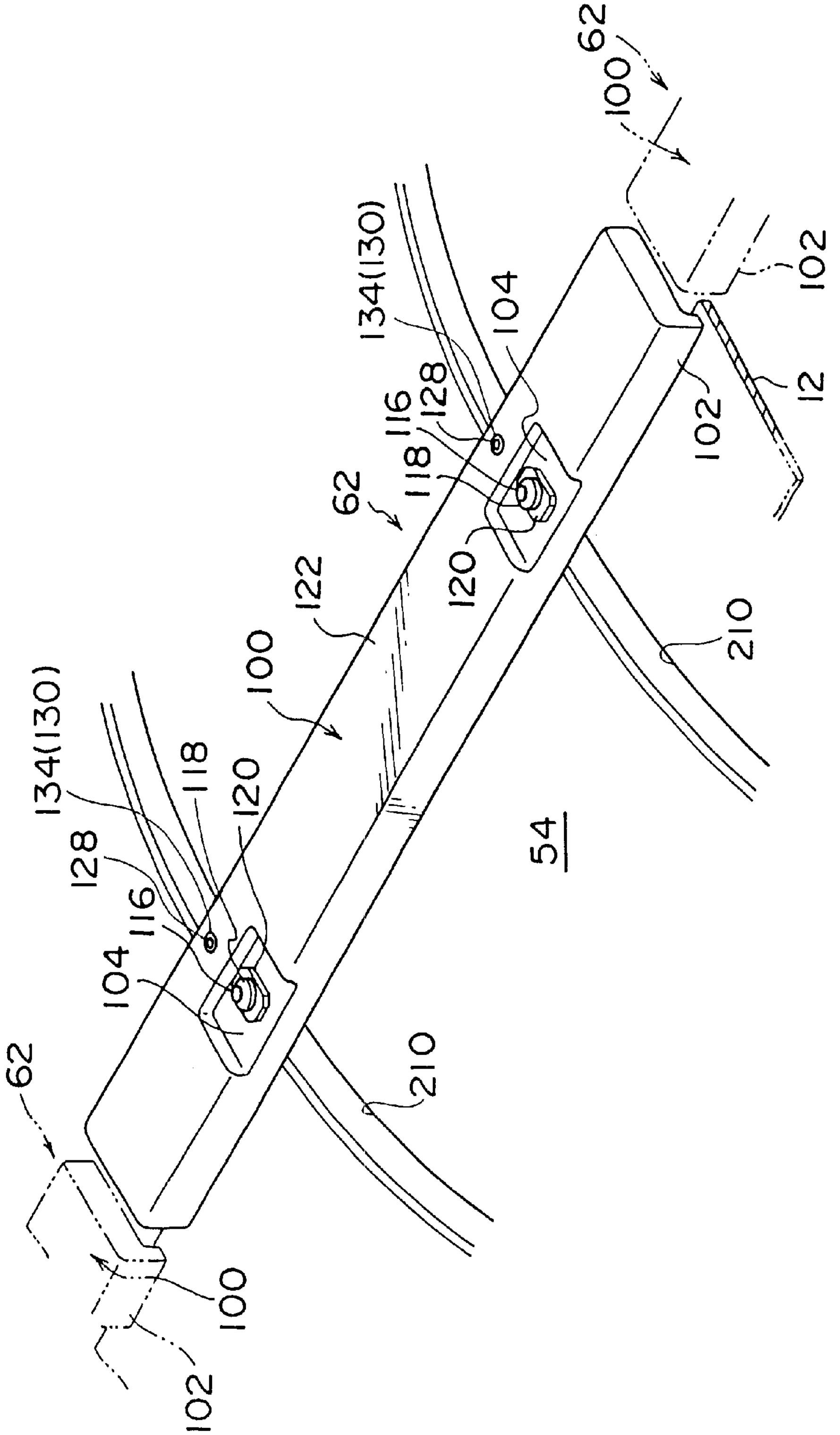
FIG. 2 is a perspective view of a leading edge (trailing edge) chuck on a rotating drum.

As illustrated in FIG. 2, the leading edge chuck 62 is provided with a clamp 100 formed in a tie plate configuration of a predetermined length. The clamp 100 is disposed along the axial direction of the rotating drum 54. A plurality of clamps 100 is provided at the rotating drum 54 in a row at predetermined intervals.

A clamp portion 102 is disposed at one width-direction end of each of the clamps 100. The clamp portions 102 project toward the circumferential surface of the rotating drum 54. The clamps 100 are disposed such that the clamp portions 102 face the upper stream side of the mounting exposure direction of the rotating drum 54. Thus, the leading edge of the printing plate 12 is nipped between the clamp portions 102 and the circumferential surface of the rotating drum 54, and the printing plate 12 is fixed to the rotating drum 54.

Figure 3:
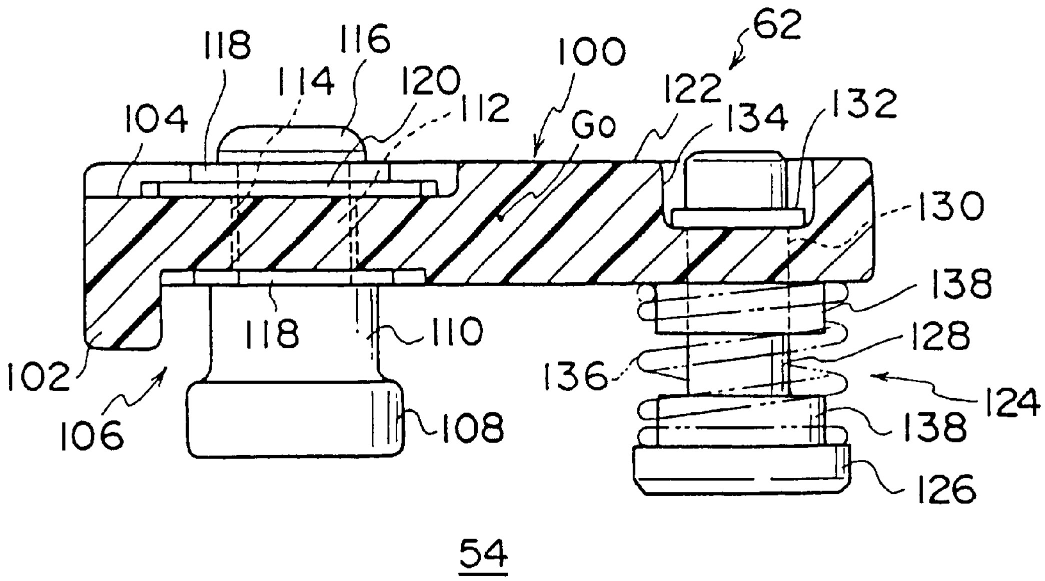
FIG. 3 is a cross-section view of the leading edge (trailing edge) chuck.

A substantially rectangular recess 104 is formed in the clamps 100 at a plurality of areas on surfaces opposite the clamp portions 102. As illustrated in FIG. 3, a leg 106 is mounted at each recess 104.

A rectangular, block-configured base 108 is provided at the leg 106. A leg portion 110 is vertically provided at the base 108. A spindle 112, which has a radius smaller than that of the leg portion 110, projects vertically from the leg portion 110.

A feed-through hole 114 which penetrates the recess 104 is provided at the clamp 100, and the spindle 112 of the leg 106 is passed through the feed-through hole 114. The clamp 100 is nipped by the leg portion 110 and a screw 116 that is screwed into the top of the spindle 112, whereby the leg 106 is connected to the clamp 100. The base 108 of the leg 106 is inserted into and fixed at the rotating drum 54 at a position further in from the outermost circumferential surface thereof (i.e., inserted into and fixed at slot portions 210 described below (see FIGS. 5A to 6B)), whereby the leading edge chuck 62 is mounted to the rotating drum 54.

A rest plate 118 formed of an elastic body is nipped between the leg portion 110 of the leg 106 and the clamp 100. A keep plate 120 formed of a flexible member in a substantially rectangular configuration is nipped between the screw 116 and the clamp 100. Further, the inside diameter of the feed-through hole 114 is slightly larger than the outside diameter of the spindle 112.

Accordingly, the clamp portion 102 can be moved downward by applying an upward force to the end of the clamp 100 opposite the end provided with the clamp portion 102. An urging leg 124 is thus provided adjacent to each leg 106.

The urging leg 124 is provided with a substantially circular, plate-shaped wear plate 126 that may oppose the circumferential surface of the rotating drum 54. A shaft 128 vertically disposed at the wear plate 126 is passed through a feed-through hole 130 formed in a pressed portion 122 of the clamp 100.

A flange portion 132 is formed in the center of the shaft 128 along an axial direction thereof. An enlarged diameter portion 134 is formed at the feed-through hole 130 at the side opposite the rotating drum 54. The flange portion 132 fits into the enlarged diameter portion 134 and prevents the shaft 128 from slipping through to the side of the clamp 100 at which the rotating drum 54 is provided.

A coiled spring 136 is disposed around the urging leg 124 between the wear plate 126 and the clamp 100. The urging leg 124 is urged toward the rotating drum 54 by an urging force of the coiled spring 136. A guide ring 138 is formed at each of the wear plate 126 and the clamp 100, and prevents displacement of the coiled spring 136.

When the base 108 of the leg 106 of the leading edge chuck 62 is inserted into a slot portion 210 (see FIGS. 5A through 6B; when seen in horizontal cross section, the slot portion 210 has a substantially inverted-T configuration) formed in the circumferential direction of the circumferential surface of the rotating drum 54, so that the base 108 is fixed with respect to the rotating drum 54, the wear plate 126 also makes direct contact with a bottom surface of the same slot portion 210.

As illustrated in FIGS. 5A through 6B, the base portion 108 is formed in a substantial parallelogram in which the corner portions thereof have been roundedly chamfered. A relationship between a dimension H and a slot portion 210 width dimension W is expressed as H<W. Further, a relationship between a dimension C between a pair of opposing vertices and the same width dimension W is expressed as C>W. For this reason, it becomes possible to insert the base portion 108 into the slot portion 210 and remove the base portion 108 from the slot portion 210 by matching the dimension H direction with the width direction of the slot portion 210. In addition, a state in which the base portion 108 is inserted into the slot portion 210 can be held and fixed by matching the dimension C direction with the width direction.

The clamp 100 is urged by the urging force of the coiled spring 136 in the direction in which the pressed portion 122 is separated from the circumferential surface of the rotating drum 54, whereby the clamp portion 102 is urged toward the circumferential surface of the rotating drum 54. The leading edge chuck 62 nips the printing plate 12 between the clamp portion 102 and the circumferential surface of the rotating drum 54 by the urging force.

Figure 4:
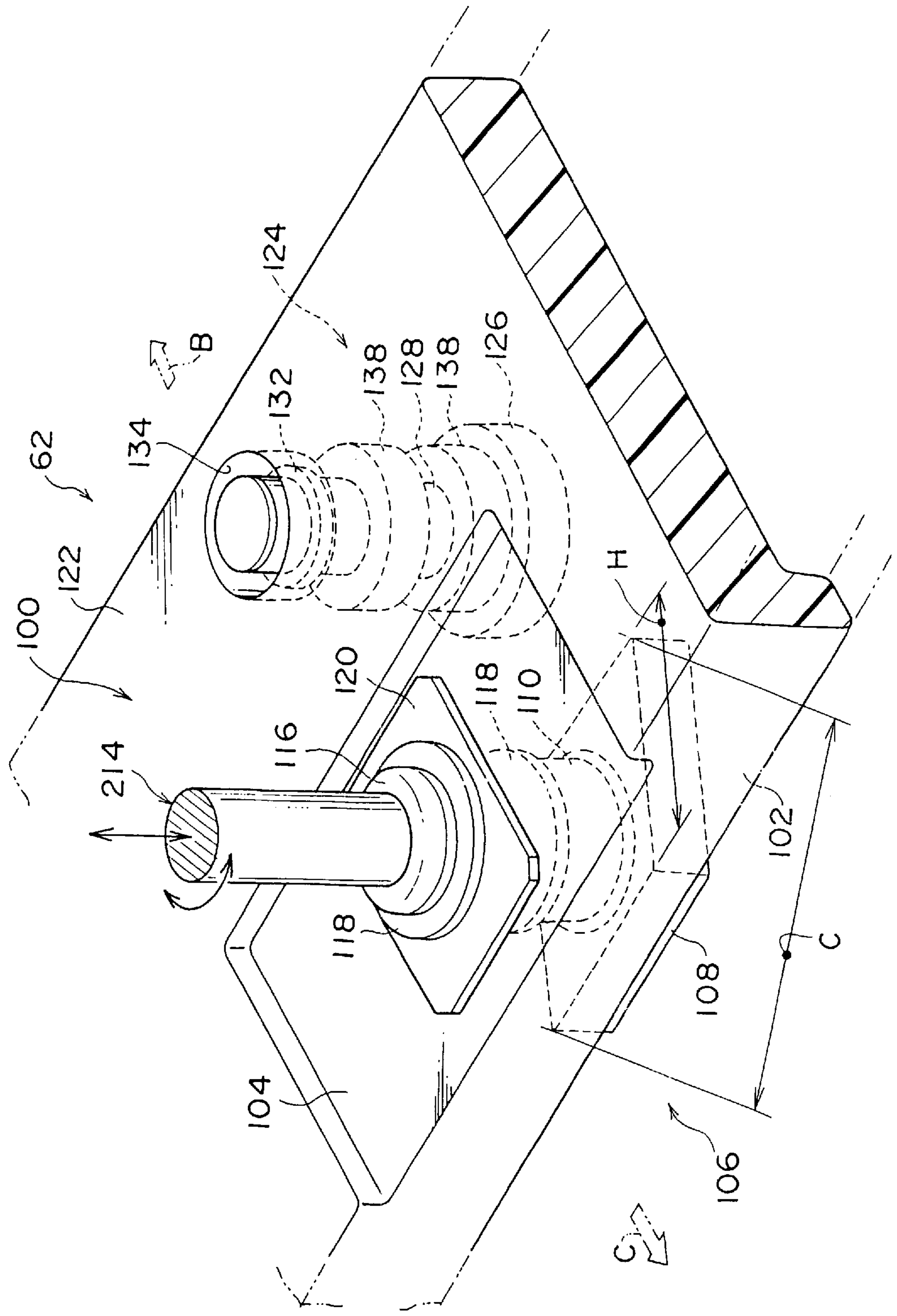
FIG. 4 is an expanded perspective view of portion of the leading edge (trailing edge) chuck for supporting the leading edge (trailing edge) chuck at the rotating drum.
Figure 5A:
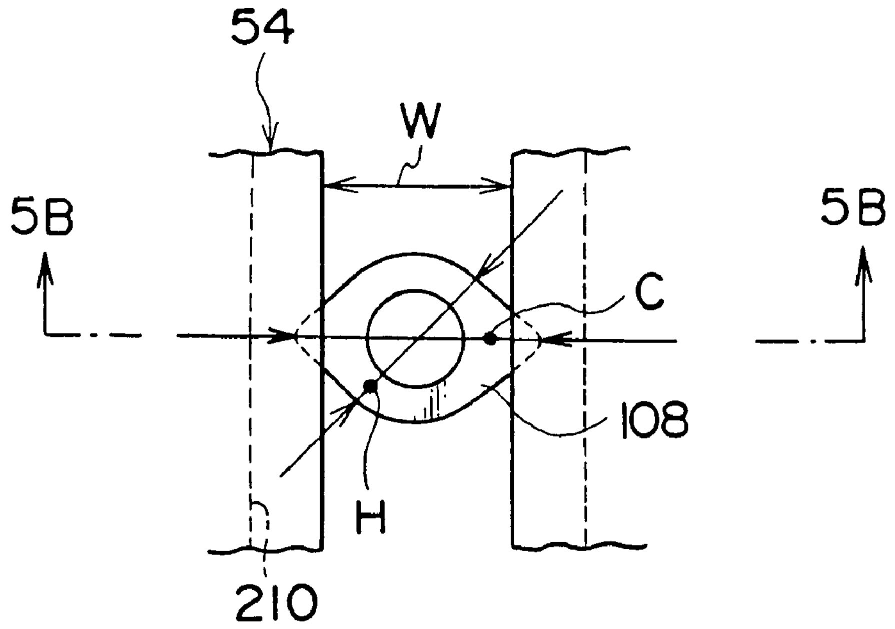
FIG. 5A is a plan view of portion of the leading edge (trailing edge) chuck for supporting the leading edge (trailing edge) chuck at the rotating drum.
Figure 5B:
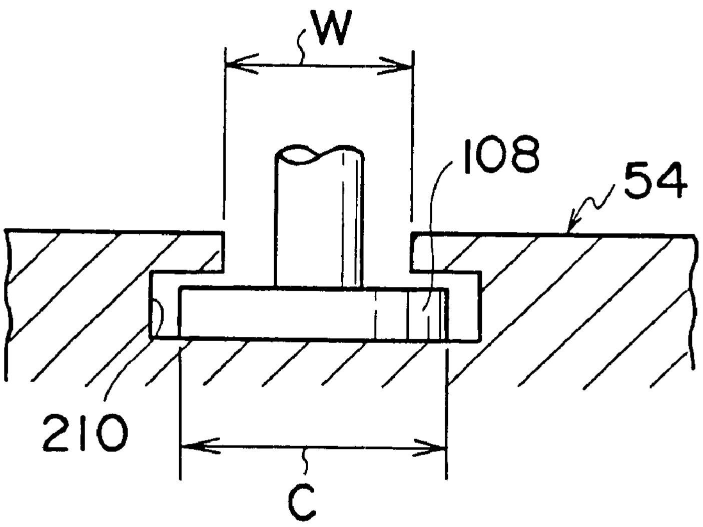
FIG. 5B is a cross-section view cut along line 5B—5B of FIG. 5A.
Figure 6A:
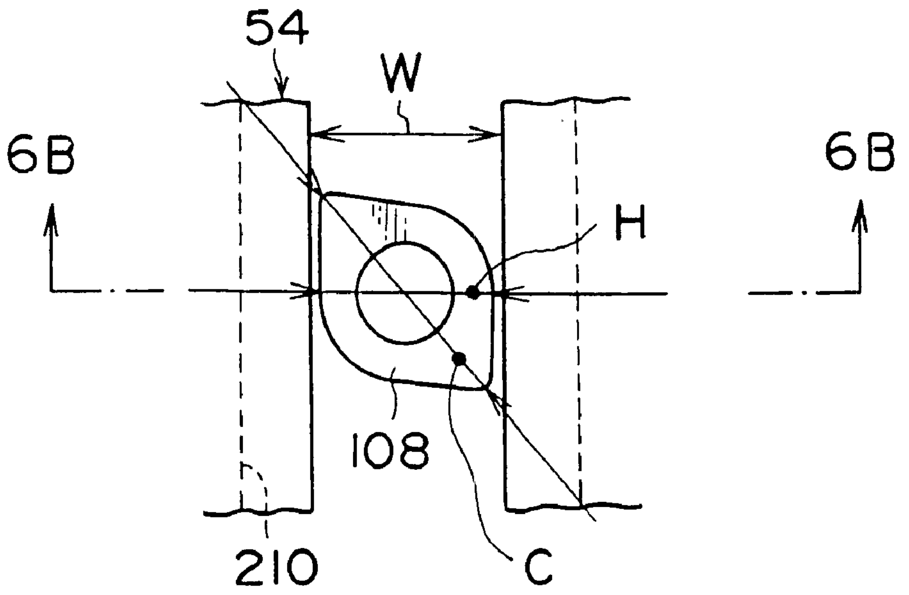
FIG. 6A is a plan view of the portion of the leading edge (trailing edge) chuck for supporting the leading edge (trailing edge) chuck at the rotating drum.
Figure 6B:
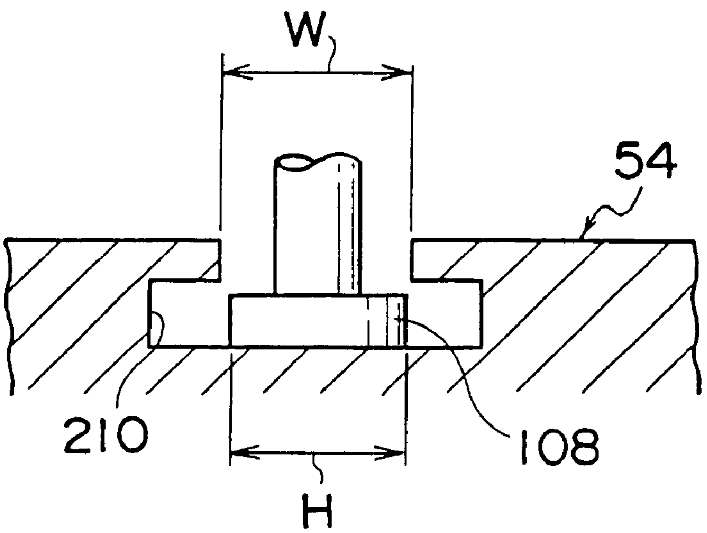
FIG. 6B is a cross-section view cut along line 6B—6B of FIG. 6A.

As illustrated in FIG. 4, a rotating shaft 214 may be inserted into the top of the screw 116. The rotating shaft 214 is rotatably moved in at least a 90° range by a driving force of an unillustrated driving means. The rotating shaft 214 can selectively match the H dimension direction or the C dimension direction of the base 108 with the width direction of the slot portion 210. Further, the rotating shaft 214 is structured to be movable in an axial direction, and is also structured to selectively move the held leading edge chuck 62 to a predetermined position at the circumferential surface of the rotating drum 54 or a position separated from the rotating drum 54.

Here, the rotating shaft 214 and the screw 116 are fit together via an unillustrated elastic means. Ordinarily, the elastic means moves in a state in which it is fit together with the rotating shaft 214, but in a state in which the leg portion 108 is fit together with the slot portion 210 and fixed thereto, when the rotating shaft 214 is moved in a direction away from the rotating drum 54, the state in which it is fit together with the screw 116 is released, and only the rotating shaft 214 is able to rise.

The working of the present embodiment will hereinafter be described.

At the image exposure apparatus 10, image data to be exposed is input, the size and number of the printing plates 12 to be subjected to image exposure are set, and when the order to initiate image exposure is given, image exposure processing of the printing plates 12 is initiated. An operation panel is provided at the image exposure apparatus 10. The image exposure apparatus 10 may be a kind in which instructions are given by operation of a switch at the operation panel, and it may be a kind in which initiation of processing by the image exposure apparatus 10 is ordered by a signal from an image processing apparatus that outputs image data to the image exposure apparatus 10.

At the image exposure apparatus 10, when processing is initiated, the reversal unit 28 and the sheet unit 30 are moved to a position corresponding to the cassettes 16 in which the printing plates 12 of a selected size are accommodated. The printing plates 12 within the appropriate cassette 16 are adsorbed and extracted by the suction cups 38, then fed toward between the reversal roller 32 of the reversal unit 28 and the conveyor belt 36. Accordingly, the printing plates 12 are nipped and conveyed by the reversal roller 32 and the conveyor belt 36, and sent toward the conveyor 42.

Figure 7A:
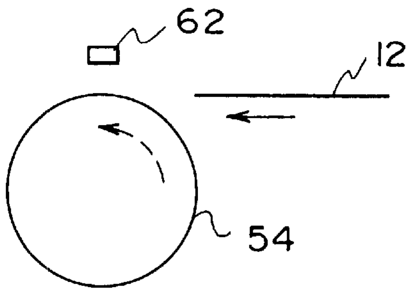
FIGS. 7A–7H are views illustrating a series of steps from clamping to removing of the printing plate with respect to the drum periphery.

The conveyor 42 inserts leading edges of the printing plates 12 into the opening 60 of the puncher 58, and the puncher 58 forms a position-determining notch at a predetermined position in the printing plates 12. When the notches are formed in the printing plates 12, the conveyor 42 extracts the printing plates 12 from the opening 60 of the puncher 58 and feeds the printing plates 12 to the circumferential surface of the rotating drum 54 (see FIG. 7A).

Figure 7B:
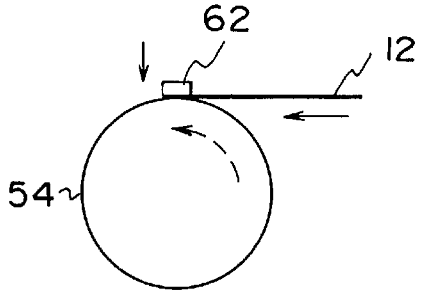
Figure 7C:
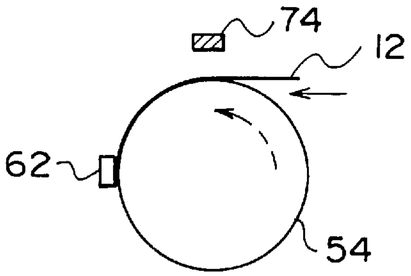
Figure 7D:
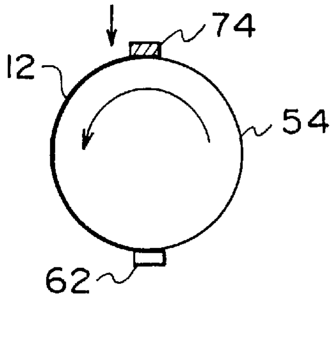

At the recording section 22, when the leading edges of the printing plates 12 are held at the rotating drum 54 by the leading edge chuck 62 (FIG. 7B) while the leading edges of the printing plates 12 are squeezed by the squeeze roller 66, the printing plates 12 are wound on the rotating drum 54 while being squeezed by the squeeze roller 66 (FIG. 7C), and the trailing edges of the printing plates 12 are held at the rotating drum 54 by the trailing edge chuck 74 (FIG. 7D).

Figure 7E:
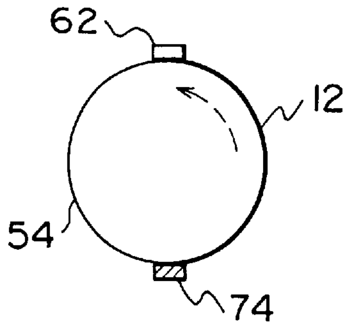
Figure 7F:
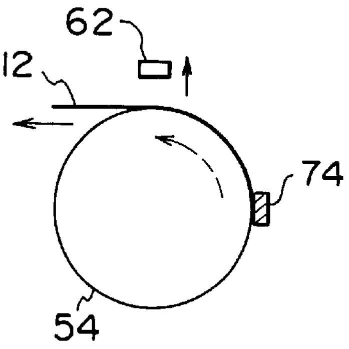
Figure 7G:
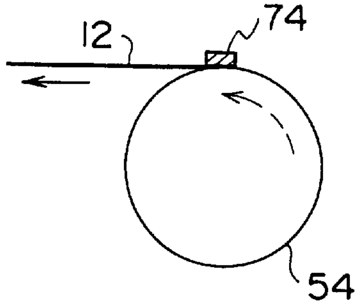
Figure 7H:
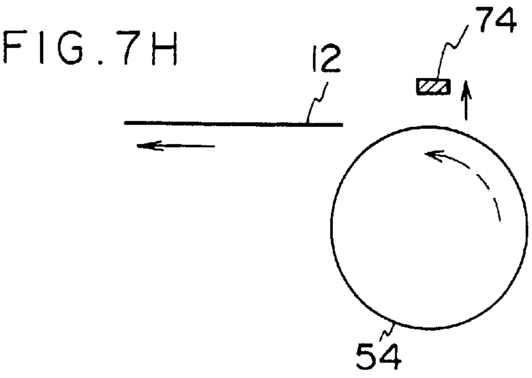

Thereafter, at the recording section 22, while the rotating drum 54 is rotated at a high speed in the same direction, a light beam based on image data from the recording head portion 54 is irradiated onto the printing plates 12, whereby the printing plates 12 are scanned and exposed. When scanning and exposure of the printing plates 12 is completed, clamping of the printing plates 12 by the leading edge chuck 62 is released. The printing plates 12 are removed from the rotating drum 54 (FIG. 7E) and fed to the ejection buffer section 24 (FIG. 7F). Clamping of the printing plates 12 by the trailing edge chuck 74 is released at a predetermined timing (FIG. 7G), and the printing plates 12 are removed from the rotating drum 54 (FIG. 7H).

At the ejection buffer section 24, the printing plates 12 are nipped and conveyed by the small roller 80A and the roller 84, and wound on the ejection roller 78. Thereafter, the small roller 80A and the roller 84 are moved opposite the outlet 76, and the printing plates 12 are fed out from the outlet 76 at a predetermined conveyance speed.

According to the present embodiment, the leading edge chuck 62 of the leading edge clamp unit 200 and the trailing edge chuck 74 of the trailing edge clamp unit 68 are removable from the rotating drum 54. Therefore, the direction in which the rotating drum 54 rotates in order for the printing plates 12 to be mounted thereon, the direction of rotation at the time the printing plates 12 are exposed, and the direction of rotation in order for the printing plates 12 to be removed from the rotating drum 54 may all be made into the same, single direction. Accordingly, labor that impacts working effectiveness, such as switching the rotational direction of the rotating drum 54, can be eliminated, and image exposure can be conducted rapidly.

Further, by the provision of a squeeze roller 66, rising of the leading edges and trailing edges of the printing plates 12 from the rotating drum 54 can be prevented, and a smooth clamping operation becomes possible. Particularly in the present embodiment, because the leading edge clamp unit 200 and the trailing edge clamp unit 68 share a common function, the present invention is both rational and economical.

What is claimed is:

1. An apparatus for subjecting sheet material to predetermined processing, the apparatus comprising:

(a) a rotatably mounted drum having a periphery for winding sheet material thereon;

(b) a leading edge clamp unit movable to a withdrawn position separated from the drum and to a clamping position proximate the drum, the leading edge clamp unit including a leading edge chuck for clamping the leading edge of the sheet material to the drum;

(c) a trailing edge clamp unit movable to a withdrawn position separated from the drum and to a clamping position proximate the drum, the trailing edge clamp unit including a trailing edge chuck for clamping the trailing edge of the sheet material to the drum;

(d) a processing element by which sheet material on the periphery of the drum is subjected to predetermined processing;

(e) a wrapping element, that moves in correspondence with a clamp operation of the leading edge chuck, to wrap the sheet material on the periphery of the drum in a sequence of a sheet material front portion, a middle portion and an end portion; and (f) a separation element, that moves in correspondence with an unclamp operation of the leading edge chuck, to separate the sheet material from the periphery of the drum in a sequence of the sheet material front portion, middle portion and end portion.

2. The apparatus according to claim 1, wherein the processing element includes a recording head for recording an image on the sheet material.

3. The apparatus according to claim 1, further including a rotating element connected to the drum, the rotating element being operable for rotating the drum in only one direction during wrapping of the sheet material, during predetermined processing, and during separation of the sheet material.

4. The apparatus according to claim 3, wherein the separation element pulls the sheet material in a direction non-contrary to the rotation of the drum when separating the sheet material from the drum.

5. The apparatus according to claim 1, wherein the separation element includes a rotation element and a guide.

6. The apparatus according to claim 1, wherein the leading edge clamp unit includes a moving mechanism, which when operated, moves the leading edge chuck between the withdrawn and clamping positions.

7. The apparatus according to claim 1, further including:

a leading edge chuck separation and connection element that, in association with the clamp operation of the leading edge chuck, separates the leading edge chuck from the moving mechanism and, in association with the unclamp operation of the leading edge chuck, connects the leading edge chuck to the moving mechanism, and a leading edge chuck mounting element that removably mounts the leading edge chuck on the drum.

8. The apparatus according to claim 7, wherein the leading edge chuck separation and connection element includes a moving mechanism rotating shaft and a leading edge chuck screw.

9. The apparatus according to claim 7, wherein the leading edge chuck mounting element includes a leading edge chuck base and slots formed along the periphery of the drum corresponding to the leading edge chuck base.

10. The apparatus according to claim 1, wherein the trailing edge clamp unit includes a moving mechanism, which when operated, moves the trailing edge chuck between the withdrawn and clamping positions.

11. The apparatus according to claim 10, further including:

a trailing edge chuck separation and connection element that, in association with the clamp operation of the trailing edge chuck, separates the trailing edge chuck from the moving mechanism and, in association with the unclamp operation of the trailing edge chuck, connects the trailing edge chuck to the moving mechanism, and a trailing edge chuck mounting element that removably mounts the trailing edge chuck unit on the drum.

12. The apparatus according to claim 11, wherein the trailing edge chuck separation and connection element includes a rotatable shaft and a trailing edge chuck screw.

13. The apparatus according to claim 11, wherein the trailing edge chuck mounting element includes a trailing edge chuck base and slots formed along the periphery of the drum corresponding to the leading edge chuck base.

14. The apparatus according to claim 1, wherein the leading edge clamp unit is positioned in the clamping position by inserting and fixing the leading edge chuck in a slot portion formed in the drum.

15. The apparatus according to claim 1, wherein the trailing edge clamp unit is positioned in the withdrawn position by withdrawing and separating the trailing edge chuck from a slot portion formed in the drum.

16. A method of subjecting sheet material to predetermined processing, using a rotatable drum having a periphery on which sheet material is wound, the method comprising the steps of:

(a) moving a leading edge clamp unit to a position proximate to the drum from a withdrawn position spaced from the drum;

(b) clamping the sheet material leading edge to the drum;

(c) winding the sheet material on the drum periphery in order of the sheet material front portion, middle portion and end portion;

(d) moving a trailing edge clamp unit to a position proximate to the drum from a withdrawn position spaced from the drum;

(e) clamping the sheet material trailing edge to the drum;

(f) subjecting the sheet material on the drum periphery to predetermined processing;

(g) disengaging the clamp on the sheet material leading edge; and (h) removing the sheet material from the drum periphery in order of the sheet material front portion, middle portion and end portion.

17. The method according to claim 16, wherein an image is recorded on the sheet material when subjecting the sheet material on the drum periphery to predetermined processing.

18. The method according to claim 16, further comprising releasing a clamp on the sheet material trailing edge after disengaging the clamp on the sheet material leading edge.

19. The method according to claim 16, wherein the sheet material is pulled in a direction non-contrary to the rotation of the drum when the sheet material is separated from the drum.

20. The method according to claim 16, wherein the drum revolves in only one direction through steps (a) through (f).

21. An apparatus for recording an image on a printing plate, the apparatus comprising:

(a) a rotatably mounted drum having a periphery for winding a printing plate thereon;

(b) a leading edge clamp unit movable to a withdrawn position spaced from the drum and to a clamping position proximate the drum, the leading edge clamp unit including a leading edge chuck for clamping the printing plate leading edge to the drum, and a moving mechanism, which when operated, moves the leading edge chuck between the withdrawn and clamping positions;

(c) a trailing edge clamp unit movable to a withdrawn position spaced from the drum and to a clamping position proximate the drum, the trailing edge clamp unit including a trailing edge chuck for clamping the printing plate trailing edge to the drum, and a moving mechanism, which when operated, moves the trailing edge chuck between the withdrawn and clamping positions;

(d) a recording head disposed for recording an image on a printing plate on the drum periphery;

(e) a wrapping element, that moves in correspondence with a clamp operation of the leading edge chuck, to wrap the printing plate on the drum periphery in a sequence of a printing plate front portion, a middle portion and an end portion; and (f) a separation element, that moves in correspondence with a clamp disengaging movement of the leading edge chuck, to separate the printing plate from the drum periphery in the sequence of the printing plate front portion, middle portion and end portion.

22. The apparatus according to claim 21, wherein the apparatus includes:

a leading edge chuck separation and connection element that, in association with the clamp operation of the leading edge chuck, separates the leading edge chuck from the moving mechanism and, in association with the clamp disengaging movement of the leading edge chuck, connects the leading edge chuck to the moving mechanism;

a leading edge chuck mounting element that removably mounts the leading edge chuck on the drum;

a trailing edge chuck separation and connection element that, in connection with the clamp operation of the trailing edge chuck, separates the trailing edge chuck from the moving mechanism and, in connection with the clamp disengaging movement of the trailing edge chuck, connects the trailing edge chuck to the moving mechanism; and a trailing edge chuck mounting element that removably mounts the trailing edge chuck on the drum.

23. The apparatus according to claim 21, wherein the recording head irradiates a light beam to conduct a main scanning by rotating the drum and to conduct a sub-scanning along a rotational axis of the drum in connection with the main scanning, such that an image may be recorded on the printing plate.

24. The apparatus according to claim 21, wherein the leading edge clamp unit is positioned in the clamping position by inserting and fixing the leading edge chuck in a slot position formed in the drum.

25. The apparatus according to claim 21, wherein the trailing edge clamp unit is position in the withdrawn position by withdrawing and separating the trailing edge chuck from a slot portion formed in the drum.

* * * * *